(12) United States Patent
De La Vega et al.

(10) Patent No.: US 10,969,525 B2
(45) Date of Patent: *Apr. 6, 2021

(54) OPHTHALMIC SUBSTRATES HAVING SURFACE WITH FUNCTIONAL DOTS CONTAINING FIRST AND SECOND PHOTOCHROMIC COLORANTS

(71) Applicant: UJETT D.P. LTD, Modiin (IL)

(72) Inventors: Fernando De La Vega, Zichron Yaakov (IL); Yinon Masad, Tel-Aviv (IL); Claudio Rottman, Modiin (IL)

(73) Assignee: UJETT D.P. LTD, Beer-Sheva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,451

(22) Filed: Jun. 3, 2019

(65) Prior Publication Data

US 2019/0391310 A1 Dec. 26, 2019

Related U.S. Application Data

(63) Continuation of application No. 15/301,955, filed as application No. PCT/IB2015/052427 on Apr. 2, 2015, now Pat. No. 10,310,151.

(30) Foreign Application Priority Data

Apr. 7, 2014 (GB) .................................. 1406200

(51) Int. Cl.
*G02B 1/11* (2015.01)
*G02B 1/14* (2015.01)
*G02B 1/18* (2015.01)
*G02B 5/02* (2006.01)
*G02B 5/20* (2006.01)
*G02B 5/23* (2006.01)

(52) U.S. Cl.
CPC .................. *G02B 5/23* (2013.01); *G02B 1/11* (2013.01); *G02B 1/14* (2015.01); *G02B 1/18* (2015.01); *G02B 5/0221* (2013.01); *G02B 5/0236* (2013.01); *G02B 5/208* (2013.01)

(58) Field of Classification Search
CPC . C03C 17/34; C03C 17/3405; C03C 17/3411; C09D 11/101; G02B 1/10; G02B 1/11; G02B 1/14; G02B 1/18; G02B 5/208; G02B 5/22; G02B 5/223; G02B 5/23; G02B 13/14; G02B 13/143; G03C 1/733
USPC ....... 359/241, 355, 359, 361, 580, 581, 582, 359/589, 590, 599, 601, 614; 427/162, 427/164, 165, 466, 469; 428/1.3, 1.31, 428/141, 143, 144
See application file for complete search history.

(56) References Cited

U.S. PATENT DOCUMENTS

| | | | | |
|---|---|---|---|---|
| 5,985,381 A | * | 11/1999 | Conner | ...................... F41H 3/00 156/272.2 |
| 10,310,151 B2 | * | 6/2019 | De La Vega | ......... G02B 5/0221 |
| 2003/0134488 A1 | * | 7/2003 | Yamazaki | ......... H01L 29/66757 438/455 |
| 2004/0091642 A1 | * | 5/2004 | Murakami | ........... G02B 5/0215 428/1.31 |
| 2004/0151014 A1 | * | 8/2004 | Speakman | ................. B41J 2/01 365/210.1 |

(Continued)

*Primary Examiner* — Ryan S Dunning
(74) *Attorney, Agent, or Firm* — Momentum IP; Marc Van Dyke

(57) ABSTRACT

Optical devices having multi-functional coatings.

20 Claims, 6 Drawing Sheets

(56) References Cited

U.S. PATENT DOCUMENTS

| | | | |
|---|---|---|---|
| 2011/0025723 A1* | 2/2011 | Kim | H01L 27/3218 |
| | | | 345/690 |
| 2012/0319089 A1* | 12/2012 | Shin | H01L 51/0017 |
| | | | 257/40 |
| 2015/0048316 A1* | 2/2015 | Choi | H01L 51/5284 |
| | | | 257/40 |
| 2015/0049389 A1* | 2/2015 | Minoura | G02B 1/118 |
| | | | 359/601 |
| 2015/0116834 A1* | 4/2015 | Osumi | G02B 1/118 |
| | | | 359/601 |

* cited by examiner

OPHTHALMIC SUBSTRATES HAVING SURFACE WITH FUNCTIONAL DOTS CONTAINING FIRST AND SECOND PHOTOCHROMIC COLORANTS

This application is a continuation of U.S. application Ser. No. 15/301,955 which was filed on Oct. 5, 2016 which application is hereby incorporated by reference, as if fully disclosed herein. U.S. application Ser. No. 15/301,955 is a 371 national stage entry of International Application No. PCT/IB2015/052427 filed on Apr. 2, 2015 which application is hereby incorporated by reference, as if fully disclosed herein. PCT/IB2015/052427 draws priority from UK Patent Application No. 1406200.4, filed Apr. 7, 2014 and entitled "COATED OPTICAL SUBSTRATES", which application is hereby incorporated by reference, as if fully disclosed herein.

FIELD OF THE INVENTION

The present invention relates to multi-functional coated optical substrates and, more particularly, to optical devices in which micrometric functional areas form a multi-functional layer on an optical substrate such as a lens.

SUMMARY OF THE INVENTION

According to some teachings of the present invention there is provided an optical device including: (a) an optical substrate; (b) at least one multi-functional layer, fixedly attached to a broad surface of the optical substrate; the multi-functional layer including a plurality of multi-functional areas, each area of the multi-functional areas including functional dots, each of the functional dots fractionally covering the area; each area of the multi-functional areas having a rectangular projection normally projecting from a direction of the layer, onto the broad surface, the rectangular projection having a contiguous area of up to 0.04 square millimeters and a short side of at least 20 micrometers; the functional dots including: a first group of the functional dots, having a first functionality; a second group of the functional dots, having a second functionality, the second functionality having a differing functionality from the first functionality; wherein, within at least one area of the multi-functional areas, the first group has a characteristic height H1, the second group has a characteristic height H2, the characteristic heights satisfying at least one of the following relationships:

$$H2 > k*H1 \quad (1);$$

$$H2 \geq H1 + k2 \quad (2);$$

k being at least 1.05; k2 being at least 1 micrometer (μm).

According to another aspect of the present invention there is provided an optical device including: (a) an optical substrate; and (b) at least one multi-functional layer, fixedly attached to the optical substrate; the multi-functional layer including a plurality of multi-functional areas, each area of the multi-functional areas including functional dots, each of the functional dots fractionally covering the area; each area of the multi-functional areas being a rectangular area having a contiguous area of up to 0.04 square millimeters and a short side of at least 20 micrometers; the functional dots including: a first group of the functional dots, having a first functionality; and a second group of the functional dots, having a second functionality, the second functionality having a differing functionality from the first functionality.

According to yet another aspect of the present invention there is provided an optical device including: (a) an optical substrate; and (b) at least one multi-functional layer, fixedly attached to the optical substrate; the multi-functional layer including a plurality of multi-functional areas, each area of the multi-functional areas including functional dots, each of the functional dots fractionally covering the area; each area of the multi-functional areas being a rectangular area having a contiguous area of up to 0.04 square millimeters and a short side of at least 20 micrometers; the functional dots including: a first group of the functional dots, having a first functionality; a second group of the functional dots, having a second functionality, the second functionality having a differing functionality from the first functionality; wherein, within at least one area of the areas, the first group has a characteristic height H1, and wherein, at the height H1, an upper characteristic diameter (D(H1)) of the second group of the functional dots is at most equal to a lower characteristic diameter (D(0)) of the second group of the functional dots at a lower or base end thereof.

According to yet another aspect of the present invention there is provided an optical device including: (a) an optical substrate; (b) at least a first multi-functional layer, fixedly attached to the optical substrate; and (c) at least a second multi-functional layer, fixedly attached to the first multi-functional layer, the first multi-functional layer disposed between the substrate and the second multi-functional layer; each of the first and the second multi-functional layers having a plurality of multi-functional areas, each area of the multi-functional areas including functional dots, each of the functional dots fractionally covering the area; each area of the multi-functional areas being a rectangular area having a contiguous area of up to 0.04 square millimeters and a short side of at least 20 micrometers; the functional dots including: a first group of the functional dots, having a first functionality; a second group of the functional dots, having a second functionality, the second functionality having a differing functionality from the first functionality.

According to yet another aspect of the present invention there is provided a method of producing a multi-functional coated optical substrate by jetting or ink-jetting, substantially as described herein.

According to further features in the described preferred embodiments, the at least one group of functional dots (often the first group of functional dots) includes a photochromic colorant.

According to still further features in the described preferred embodiments, the functional dots further include a third group of the functional dots having a third functionality, the third functionality having a differing functionality with respect to the first and second functionalities.

According to still further features in the described preferred embodiments, P represents a number of the groups of functional dots, and wherein a number of the groups of functional dots having the photochromic colorant is at most (P−1).

According to still further features in the described preferred embodiments, P is at least 3, at least 4, or at least 5.

According to still further features in the described preferred embodiments, the photochromic colorant covers less than 70%, less than 60%, less than 40%, or less than 20% of a total surface area of the multi-functional layer.

According to still further features in the described preferred embodiments, the second composition differs with respect to said first composition.

According to still further features in the described preferred embodiments, the second functionality differs with respect to said first functionality.

According to still further features in the described preferred embodiments, k2 is at least 1.5 µm, at least 2 µm, at least 3 µm, at least 4 µm, or at least 5 µm.

According to still further features in the described preferred embodiments, the second group of functional dots has an anti-scratch functionality.

According to still further features in the described preferred embodiments, the multi-functional groups are selected from the group consisting of an anti-reflectant, an anti-scratch material; an anti-fog material; and an ultraviolet (UV) absorber.

According to still further features in the described preferred embodiments, k is at least 1.10, at least 1.15, at least 1.20, at least 1.30, at least 1.45, at least 1.60, at least 1.80, or at least 2.00.

According to still further features in the described preferred embodiments, k is at most 3.0, at most 2.6, at most 2.4, at most 2.2, or at most 2.1.

According to still further features in the described preferred embodiments, k is within a range of 1.07 to 2.8, 1.07 to 2.5, 1.07 to 2.3, 1.07 to 2.0, 1.07 to 1.8, 1.07 to 1.7, 1.07 to 1.6, 1.07 to 1.5, 1.07 to 1.4, 1.07 to 1.3, 1.15 to 1.8, 1.15 to 1.6, or 1.15 to 1.4.

According to still further features in the described preferred embodiments, the optical substrate is a curved optical substrate, and the broad surface is a curved broad surface.

According to still further features in the described preferred embodiments, within each area of the multi-functional areas, a gap between adjacent functional dots belonging to the first and second groups, respectively, is at least 5 µm, at least 8 µm, at least 10 µm, at least 12 µm, at least 15 µm, or at least 20 µm.

According to still further features in the described preferred embodiments, the gap is at most 50 µm, at most 45 µm, at most 40 µm, at most 35 µm, at most 30 µm, or at most 25 µm.

According to still further features in the described preferred embodiments, within each area of the multi-functional areas, a gap between adjacent functional dots belonging to the first and second groups, respectively, is at least 5 µm, at least 8 µm, or at least 10 µm, and at most 100 µm, at most 50 µm, at most 45 µm, at most 40 µm, at most 35 µm, at most 30 µm, or at most 25 µm, at most 20 µm, at most 18 µm, or at most 15 µm.

According to still further features in the described preferred embodiments, within each area of said multi-functional areas, a gap between adjacent functional dots belonging to the first and second groups, respectively, is at most 100 µm, at most 50 µm, at most 45 µm, at most 40 µm, at most 35 µm, at most 30 µm, or at most 25 µm, at most 20 µm, at most 18 µm, or at most 15 µm, the adjacent functional dots being physically discrete.

According to still further features in the described preferred embodiments, the gap is an average gap of at least 10, at least 25, at least 50, or at least 100 randomly selected multi-functional areas of the plurality of multi-functional areas.

According to still further features in the described preferred embodiments, the gap is an average gap between all pairs of the adjacent functional dots within an optical field of view image, the image containing at least 10, at least 25, at least 50, at least 100 functional dots.

According to still further features in the described preferred embodiments, the functional dots are distributed over a nominal surface area, the functional dots having a total coverage area, a ratio of the total coverage area to the nominal surface area being at most 0.98, at most 0.96, at most 0.94, at most 0.92, at most 0.90, at most 0.85, at most 0.80, at most 0.75, at most 0.70, at most 0.65, at most 0.60, at most 0.55, at most 0.50, at most 0.45, at most 0.40, or at most 0.35.

According to still further features in the described preferred embodiments, this ratio is at least 0.35, at least 0.40, at least 0.45, at least 0.50, or at least 0.55.

According to still further features in the described preferred embodiments, this ratio is within a range of 0.50 to 0.98, 0.50 to 0.90, 0.55 to 0.90, 0.60 to 0.90 or 0.65 to 0.90.

According to still further features in the described preferred embodiments, the multi-functional layer is directly attached to the optical substrate.

According to still further features in the described preferred embodiments, the multi-functional layer is separated from the optical substrate by a distance of at most 1000 nm, at most 700 nm, at most 500 nm, at most 300 nm, at most 200 nm, at most 150 nm, at most 120 nm, at most 100 nm, at most 80 nm, at most 60 nm, or at most 40 nm. According to still further features in the described preferred embodiments, the optical substrate has a thickness of at least 0.5 mm, at least 1 mm, at least 1.5 mm, at least 2 mm, at least 3 mm, at least 4 mm, at least 5 mm, at least 6 mm, at least 8 mm, at least 10 mm, or at least 20 mm.

According to still further features in the described preferred embodiments, at least one group of the groups of functional dots includes at least one of a UV absorber, an anti-reflectant, an anti-scratch material, an impact resistance material, and an anti-fog material.

The anti-scratch coatings produced may have a haze value of at most 5%, at most 4%, at most 2.5%, or at most 1%, and typically have a haze value of at least 0.5% or at least 0.8%, using the ASTM D1004-08 described hereinbelow.

According to still further features in the described preferred embodiments, the optical substrate is a lens.

According to still further features in the described preferred embodiments, the optical substrate is a thermoplastic optical substrate or a glass optical substrate.

According to still further features in the described preferred embodiments, the second multi-functional layer is directly attached to the first multi-functional layer, or to an overcoat layer thereof.

According to still further features in the described preferred embodiments, the composition of at least one, at least two, or all of the groups of functional dots differs with respect to the composition of said broad surface of said optical substrate.

According to still further features in the described preferred embodiments, at least one, at least two, or all of the groups of functional dots include, mainly include, or consist of jetted dots.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF THE PREFERRED EMBODIMENTS

Figure 1A:
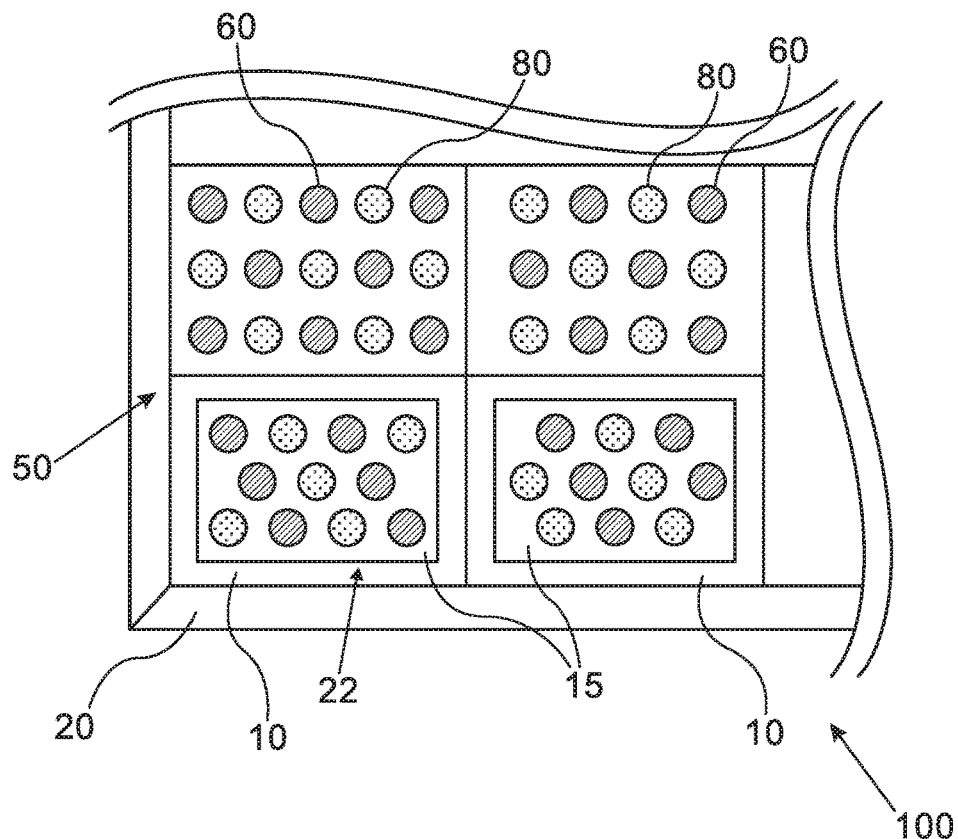
FIG. 1A is a schematic top perspective view of an optical substrate having a multi-functional layer fixedly attached to a broad surface thereof, according to embodiments of the present invention.

The principles and operation of the optical devices according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Coated optical substrates often contain at least one photochromic colorant. Such dyes typically change color—reversibly—in response to ultraviolet light, usually typically turning clear in the absence of sunlight or other source of ultraviolet light.

In this photochromic transition, the photochromic colorant undergoes a reversible photochemical reaction in which an absorption band in the visible part of the electromagnetic spectrum changes in strength or wavelength.

For practical use in optical coatings, the properties of the photochromic material must satisfy numerous performance criteria, conditions and constraints, a non-exhaustive list of which includes:

providing a noticeable, major change in color;
rate of color change (both ways)
minimal residual color
thermal stability under ambient conditions for both states of the photochromic colorant;
sufficient efficiency of the photochromic change with respect to the amount of light absorbed ("quantum yield");
minimal or sufficient non-overlapping of the active absorbance bands of the two states;
long-term stability of the photochromic reversibility ("fatigue resistance"). Photochromic materials become less reversible over time, due to photodegradation, photo-oxidation, and other processes;
provide a suitable environment accommodating the polarity of each state, and the resultant differential in polarity.

There exist sundry technological challenges in producing coated optical substrates, and more particularly, multi-functional coated optical substrates having at least one photochromic ink or substance.

In producing coated optical substrates, technological challenges include:

the refractive index of the coating is constrained to be similar to that of the optical substrate;
mechanical properties (e.g., abrasion scratch and impact resistance, thermal stability): since optical elements may be exposed to rough conditions in normal use; and
optical quality: clarity, no haze, no optical effects, no defects, no color.

The technological challenges may also relate to various stringent performance criteria for the coated optical device, such as the kinetics of the color change, residual color, uniformity of the color change, and the physical and chemical durability of the coated optical device over the long term.

In producing multi-functional coated optical substrates, the technological challenges and hurdles may relate to the peculiarities and special requirements of each photochromic ink, to the special characteristics and requirements of the optical substrate, and to the integration of this ink, along with the other inks or materials providing the multi-functionality, with the optical substrate.

The inventors have found that introducing a plurality of photochromic materials into a single inkjet formulation may appreciably compromise the coating performance (including photochromic performance, mechanical performance, fatigue resistance). Each photochromic material may have singular intrinsic kinetics with respect to the photochromic change.

Moreover, the constraints introduced by including such a plurality of photochromic materials into a single inkjet formulation may result in the formulation being unsuitable for ink-jetting (e.g., excessive viscosity or surface tension).

One aspect of the present invention pertains to a method of applying a plurality of formulations to an optical substrate. Another aspect of the present invention pertains to a multi-functional coated optical substrate in which micrometric functional areas form at least one multi-functional layer thereon. Various aspects of the present invention pertain to specific structural features of such multi-functional coated optical substrates.

The inventors have found that applying a plurality of optical coatings to an optical substrate involves a variety of technological hurdles. Some of these relate to optical substrates, which tend to be highly smooth, and substantially non-absorbent. Optical substrates are generally transparent, and may require a high degree of transparency from the plurality of optical coatings. Moreover, the refractive index of each coating, or of all the coatings together, is constrained to be similar to that of the optical substrate.

The plurality of optical coatings must satisfy mechanical criteria such as hardness and/or scratch resistance. Each of the plurality of coatings must also be relatively inert to the other coatings in contact therewith. Moreover, since the coatings may be applied successively, at least one of the applied wet, or uncured, formulations may contact, and interact with, a previously applied coating. This may be particularly problematic in the case of successive applications of different photochromic ink formulations.

The curing time of each coating should be reasonable (minutes or hours), and the minimum curing temperature should be sufficiently low so as not to damage the optical substrate, nor damage any previously applied coatings.

An inventive coated optical substrate may be prepared by printing two different inks, each ink containing a different functional material (e.g., two photochromic dyes). In a first step, a first array of drops containing the first function (photochromic dye no. 1) is printed (ink-jetted) such that the distance between drops, measured from the center of a first drop to the center of the adjacently jetted drop, is 100 micrometers (μ).

In order to control the viscosity at jetting, the printhead may be heated, e.g., to a temperature within a range of 30° C. to 60° C., or 35° C. to 55° C. In order to control the spreading of the drops on the optical substrate, the substrate may be heated to 30° C. to 60° C., 35° C. to 60° C., 40° C. to 60° C., or 45° C. to 60° C.

In a second step, a second array of drops containing the second function (photochromic dye no. 2) is printed (ink-jetted) between the drops of the first array of drops. The drops of the second function may be printed under the same general conditions described above, but so as to be placed at a particular, generally pre-defined distance from the adjacent drops of the first function, measured from the center of the first function drop to the center of the second function drop.

The drop characteristics may be optimized using a strobe.

Thermal curing is then performed, typically at 100° C. to 140° C., typically for up to several hours.

The inventors have found that various functional ink-jet formulations tend to spread over the surface of the optical substrate, as described hereinabove, which may compromise or severely impair precise positioning of jetted drops on the surface of optical substrate. Moreover, jetted drops of different functionalities may bleed or coalesce. The inventors have developed an anti-wetting formulation that is suitable for ink-jetting, and that may largely inhibit this phenomenon.

The anti-wetting formulation is produced as follows: a mixture of 85% Dowanol™ PMA (propylene glycol methyl ether acetate) and 15% of Dowanol™ TPM (tripropylene glycol methyl ether) is prepared. To this mixture are added 20% BYK®340 (BYK Additives & Instruments) and 10% polyvinyl butyral (Mowital® B 20 H, Kuraray Co., Ltd., Japan), containing 18-21% polyvinyl alcohol and 1-4% polyvinyl acetate, based on the technical data sheet of the manufacturer. The resultant mixture may be stirred for about an hour, followed by filtering with a PTFE syringe filter rated at 1 micrometer (μm), having a diameter of 25 mm, and equipped with a polypropylene housing and a pre-filter. The anti-wetting formulation may then be loaded in the inkjet printer cartridge.

In order to produce generally round ink dots that are substantially free of spreading/bleeding and coalescing phenomena, the anti-wetting formulation may be deposited on the substrate prior to the printing of the functional inks. The anti-wetting formulation may be recorded solely in or near the areas where the functional ink is to be printed, or as a thin layer over an entire, continuous area of the substrate. After drying, one or more functional inks may be printed over the dried dots or areas of the anti-wetting layer or coating.

Using the anti-wetting formulation and the functional inks described hereinbelow, the inventors have succeeded in printing interdisposed or interlaced sets or arrays of functional ink dots on various optical substrates, including flat glass substrates of various sizes, ophthalmic lenses of various shapes and materials, including glass, polycarbonate and CR-39 (or allyl diglycol carbonate—ADC). Moreover, although curved optical surfaces may appreciably exacerbate the spreading and bleeding phenomena, the inventors have succeeded in printing such interdisposed sets of functional ink dots on various optical substrates having such curved optical surfaces.

In order to control or shift the refractive index of the instant formulations and coatings, various nanoparticles such as $TiO_2$ and $ZrO_2$, having refractive indices of 1.6 to 1.8, may be added. It is essential, however, to get a stable non-aggregated dispersion of the particles in the ink, with no agglomeration or sedimentation. In addition, the active ingredient (i.e., nano-particles) concentration should be adjusted and optimized vs. viscosity and surface tension, such that the ink formulation remains suitable for jetting.

Another direction for controlling or shifting the refractive index of the instant formulations and coatings is to add to the formulation small quantities of hard oligomers characterized by high refractive indices, such as poly(pentachlorophenyl methacrylate) or polyfunctional zirconium and hafnium acrylate monomers having a refractive index above 1.6.

The formulations used to produce the optical devices and structures of the present invention may be tailored to be suitable for other properties of the optical substrate.

For example, surface energy adjustments may be made by introducing specific surfactants (wetting agents) to the formulation, such as BYK®-333 (reduces surface tension). The chemical stability of the surface may be adjusted by pre-coating for protection or by selecting a solvent that does not dissolve the substrate. Adhesion issues and needs may be addressed by binders (different binders for different substrates, like PBB for glass or polycarbonate). Leveling agents (like BYK®-358) may be introduced to assure surface smoothness of the jetted drops and to avoid or appreciably reduce the phenomenon of "coffee rings".

FIG. 1A is a schematic top perspective view of an exemplary inventive optical construction or device 100 produced by the inventive method. Optical construction 100 includes an optical substrate 20 such as a lens, and a multi-functional layer 50 (better shown in FIG. 1B) fixedly attached and adhering to a broad, optical surface 22 of optical substrate 20. Multi-functional layer 50 includes a plurality of multi-functional areas 15, each of which being contained by a respective rectangular projection 10 (i.e., an imaginary rectangular projection) normally projecting from a direction of the layer, onto surface 22. Each rectangular projection is quite small, having a contiguous area of up to 0.04 square millimeters. A short side of rectangular projection 10 has a length (W) of at least 20 micrometers.

Each of multi-functional areas 15 includes a first group of functional dots such as functional dots 60, having a first composition and having a first functionality, and at least a second group of functional dots such as functional dots 80, having a second composition and having a second functionality. As will be elaborated hereinbelow, the second functionality may differ with respect to the first functionality, and the second composition may differ with respect to the first composition. In the exemplary structure provided in FIGS. 1A and 1B, functional dots 60 and functional dots 80 are interdisposed (or alternately disposed).

Figure 1B:
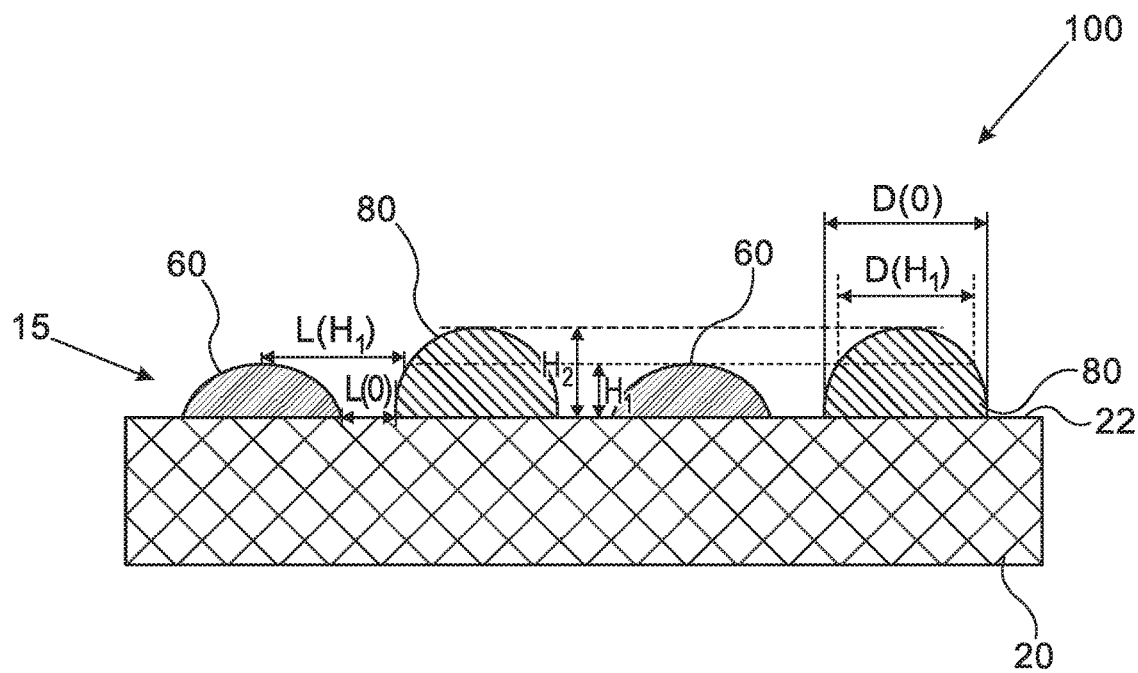
FIG. 1B is a schematic cross-sectional view of an optical substrate having a multi-functional layer fixedly attached to a broad surface thereof, according to embodiments of the present invention.

A schematic, partial cross-sectional view of the optical construction 100 of FIG. 1A is provided in FIG. 1B, in which is shown a portion of a multi-functional area 15 attached to optical substrate 20. The portion of multi-functional area 15 shown includes a plurality of functional dots 60, 80, each fractionally covering multi-functional area 15.

Typically, each of the at least first and second functionalities is selected from the group consisting of an anti-reflectance functionality, anti-scratch functionality; anti-fog functionality; ultraviolet (UV) absorber functionality; and photochromic functionality.

In some embodiments, the plurality of first functional dots 60 has a characteristic or average height H1. At characteristic height H1, an upper characteristic length, upper characteristic diameter D(H1), or upper characteristic cross-sectional area of the second group of the functional dots is at most equal to a lower characteristic length, lower characteristic diameter D(0), or lower characteristic cross-sectional area of the second group of the functional dots at a lower or base end thereof, i.e., at the height of surface 22, at the interface between surface 22 and functional dots 80.

In some embodiments, a baseline gap L(0) or an average baseline gap between adjacent functional dots 60, 80 having different functionality, may be at least 5 μm, at least 8 μm, at least 10 μm, at least 12 μm, at least 15 μm, or at least 20 μm. The baseline gap is measured at the bottom of the functional dots, as shown.

In some embodiments, a peak gap L(H1) or an average peak gap between adjacent functional dots 60, 80 having different functionality, may be at least 12 μm, at least 15 μm, at least 20 μm, at least 30 μm, or at least 40 μm. The peak gap is measured at the top of the functional dots. When the second group of dots has a higher characteristic height than the characteristic height (H1) of the first as shown, and is measured substantially parallel to the top surface 22 of optical substrate 20.

In some embodiments, peak gap L(H1) or the average peak gap may exceed baseline gap L(0) or the average baseline gap by at least 6 μm, at least 8 μm, at least 10 μm, at least 12 μm, at least 15 μm, or at least 20 μm.

Figure 2:
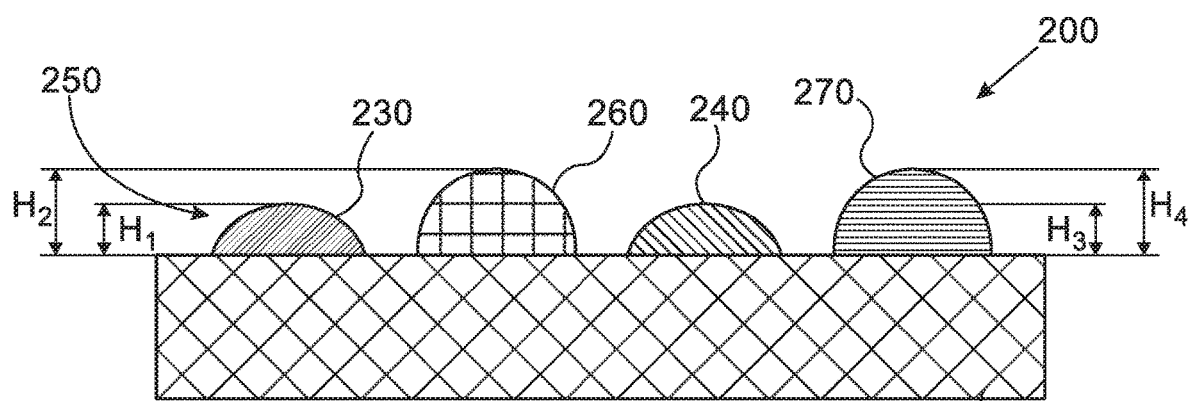
FIG. 2 provides a schematic cross-sectional view of an inventive optical construction including an optical substrate having a multi-functional layer affixed thereto, the multi-functional layer including functional dots having different characteristic heights.

FIG. 2 is a schematic cross-sectional view of an inventive optical construction or device 200 including an optical substrate 20 having a multi-functional layer 250 affixed thereto. Multi-functional layer 250 includes a first group or set of functional dots such as first functional dots 230, having a first composition and having a first functionality, and at least a second group or set of functional dots such as second functional dots 260, having a second composition and having a second functionality. In FIG. 2, the second functional dots 260 are disposed between the first functional dots 230 (or the first and second functional dots are "interdisposed". In the exemplary structure provided in FIG. 2, the first set of functional dots 230 and the second set of functional dots 260 have differing characteristic heights (H1 and H2, respectively). These characteristic heights may fulfill the following relationship:

$$H2 > k*H1,$$

wherein k is a constant having a value of at least 1.05. In some embodiments, k is at least 1.10, at least 1.15, at least 1.20, at least 1.30, at least 1.45, at least 1.60, at least 1.80, or at least 2.00.

In some embodiments, k is at most 3.0, at most 2.6, at most 2.4, at most 2.2, or at most 2.1.

For adjacent dots, or for an average between adjacent dots, H2 may exceed H1 by at least 1.0 μm, at least 1.5 μm, at least 2.0 μm, at least 3 μm, at least 4 μm, or at least 5 μm. Typically, H2 may exceed H1 by at most 10 μm, at most 8 μm, or at most 6 μm.

The inventors have found that by having second set of functional dots 260 protrude above first set of functional dots 230, second set of functional dots 260 may protect first set of functional dots 230 from various kinds of mechanical damage or trauma, including scratching and rubbing operations.

By way of example, first set of functional dots 230 may advantageously contain, primarily contain, or consist essentially of, a first photochromic material.

By way of example, second set of functional dots 260 may advantageously include, primarily include, or consist essentially of an anti-scratch formulation or material.

In some embodiments, multi-functional layer 250 may further include a third set of functional dots 240 having a characteristic height H3. By way of example, third set of functional dots 240 may advantageously include, primarily include, or consist essentially of, (i) a first photochromic material or ink dot; (ii) a dot produced from an anti-glare formulation; (iii) a dot produced from an anti-fog formulation; (iv) a dot produced from an anti-reflection formulation; (v) a dot produced from a UV-absorbing formulation; (vi) a dot produced from an anti-scratch formulation (including an abrasion resistance, impact resistance, and/or scratch resistance formulation); or a dot produced from a dye/colorant formulation providing a fixed tint.

In some embodiments, multi-functional layer 250 may further include a plurality of a fourth set of functional dots 270 having a characteristic height 114.

These characteristic heights may fulfill the following relationship:

$$H4 > k*H3.$$

Additionally or alternatively, these characteristic heights may fulfill at least one of the following relationships:

$$H2 > k*H3;$$

$$H4 > k*H1.$$

By way of example, third set of functional dots 240 may advantageously contain, primarily contain, or consist essentially of, a second photochromic material.

By way of example, fourth set of functional dots 270 may advantageously include, primarily include, or consist essentially of an anti-scratch formulation or material, an anti-glare formulation or material, or a UV-absorbing formulation.

In some embodiments, at least two, at least three, or at least four of the sets of functional dots 230, 240, 260, 270 are photochromic dots.

Third set of functional dots 240 may be disposed so as to be mechanically protected by second set of functional dots 260 and/or by fourth set of functional dots 270.

The characteristic differential in dot heights between different sets of functional dots may be achieved in various ways. For example, when only one drop-volume is possible, the formulation of the ink may be changed to promote or to inhibit spreading of the drop.

The parameters of the ink that may affect the height include:
  Inhibiting the spreading of the drop can be achieved by:
    changing the rheology of the ink using rheology modifier that produces thixotropy;
    expediting drying by using a high evaporation-rate solvent or co-solvent and/or heating the substrate;
    treating the surface of the substrate to change the surface tension of the substrate.
  Promoting the spreading by:
    reducing the viscosity (by using a different solvent or surfactant);
    increasing wetting using wetting agents or applying surface treatment (chemical or physical).

In another approach, drop volume may be controlled (increased or decreased) by using a print head that has a gray scale feature such as the XAAR head (1001 GS6). The gray scale feature allows variable sized drops of ink to be deposited directly on the substrate. Thus, by both increasing the volume of the drop and preventing spreading (as described in the previous approach), the height differential may be achieved.

In another approach, drop approach, drop height may be varied, for a given drop volume, by formulating inks having different solids concentrations. This is exemplified in Examples 36-38 hereinbelow.

Figure 3:
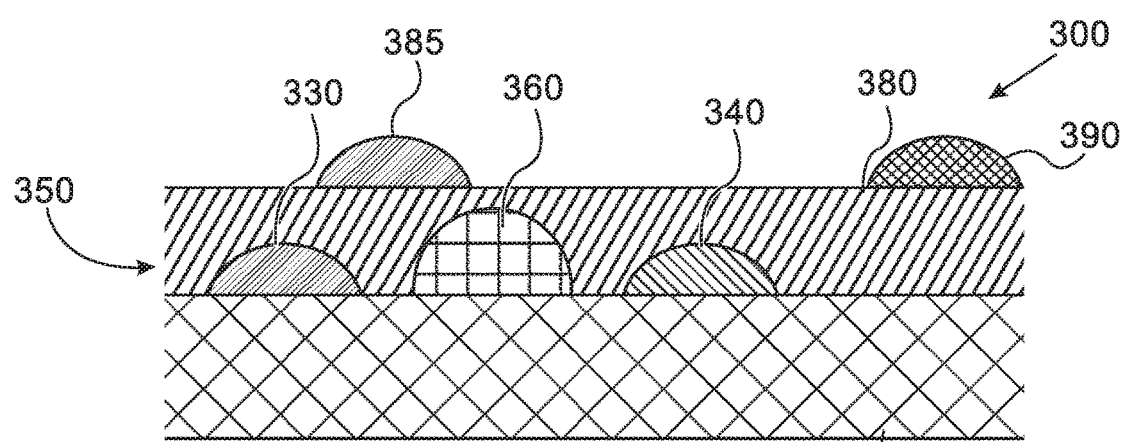
FIG. 3 is a schematic cross-sectional view of an inventive optical construction including an optical substrate having a multi-functional layer affixed thereto, the multi-functional layer including at least three arrays of functional ink dots.
Figure 4:
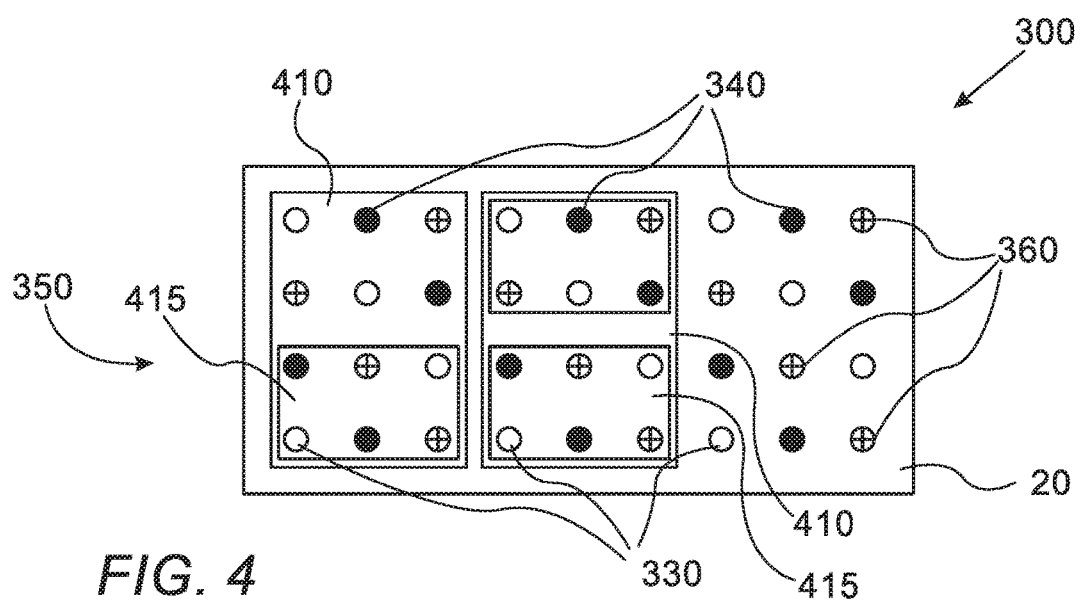
FIG. 4 provides a schematic top view of the inventive optical construction of FIG. 3.

FIG. 3 is a schematic cross-sectional view of an exemplary inventive optical construction or device 300 including an optical substrate 20 having a multi-functional layer 350 affixed thereto. Multi-functional layer 350 includes a plurality of multi-functional areas, each including a plurality of first, second, and third functional dots, such as functional dots 330, 360, and 340, the plurality of first, second, and third functional dots being interdisposed. This is further evident from FIG. 4, which provides a schematic top view of inventive optical construction 300.

With reference again to FIG. 3, multi-functional layer 350 may be covered or at least partially covered by an overcoat layer 380, which may be applied, by way of example, by an inkjet printer operating in layer mode. Other methods of application will be evident to those of skill in the art. Overcoat layer 380 is typically applied after multi-functional layer 350 has been cured.

In some embodiments, an additional functional or more typically, an additional multi-functional layer, may be disposed on top of multi-functional layer 350, either directly, or on top of overcoat layer 380, as shown. The additional multi-functional layer may be similar to multi-functional layer 350, including a plurality of multi-functional areas, each having a plurality of functional dots, such as functional dots 385 and 390. This additional multi-functional layer may be covered by an overcoat layer (not shown) that may be substantially similar to overcoat layer 380.

Each functional dot of the additional multi-functional layer may be disposed at least partially above (e.g., functional dot 385) or fully above a functional dot in multi-functional layer 350. In some embodiments, functional dots of the additional multi-functional layer may be disposed such that functional dots in multi-functional layer 350 do not even partially intercede between functional dots of the additional multi-functional layer and optical substrate 20. The term "above" is with respect to a line extending normally upward in the direction of multi-functional layer 350.

Referring again to FIG. 4, a multi-functional layer 350 adhering to optical substrate 20 includes a plurality of multi-functional areas 415, each of which is contained by a respective rectangular projection 410 (i.e., an imaginary rectangular projection) normally projecting from a direction of the multi-functional layer, onto the upper surface of optical substrate 20, and substantially as described hereinabove.

EXAMPLES

Reference is now made to the following examples, which together with the above description, illustrate the invention in a non-limiting fashion.

Materials and Equipment

BYK®-333 (ALTANA AG): a silicone-containing surface additive for solvent-free, solvent-borne and aqueous coating systems, printing inks and adhesive systems as well as ambient-curing plastic systems; adapted to strongly reduce surface tension.

BYK®-358 N (ALTANA AG): a surface additive on polyacrylate-basis for solvent-borne coating systems and printing inks; a standard leveling additive; adapted to add no turbidity in clear coats and no haze in pigmented systems.

PH-1209 (Chromtech Ltd 2 Bergman Street, Rabin Park 76705 Rehovot Israel): a pale yellow (or slightly rose) powder; an aryl substituted heterocyclic photochromic dyestuff; melting point of 180-181° C.

PH-2228 (Chromtech Ltd): a yellow photochromic powder; an aryl substituted heterocyclic photochromic dyestuff; melting point of 171-173° C.

465 (Chromtech Ltd): a yellow or pale bluish powder, an aryl substituted heterocyclic photochromic dyestuff; melting point of 139-140° C.

4114 (Chromtech Ltd); a pale-yellow greenish photochromic powder; an aryl substituted heterocyclic photochromic dyestuff; melting point of 166-167° C.

6121F-80 (Eternal Chemical Co.): an aromatic urethane diacrylate diluted in 20% DPGDA.

X-10 (HCS Korea, 715, Jungwoo Venture Town II, 1228-1 Shingil-Dong, Danwon-Gu, Ansan-City Kyunggi-Do, Korea): transparent, temperature curable coating material containing, by weight, 30-40% copolyester resin, 20-30% water, and 20-30% silica sol.

Dowanol™ PMA Glycol Ether (Propylene glycol monomethyl ether acetate, or PMA) (Dow Chemical Company Ltd). Characteristic physical properties of the Dowanol™ PMA are:

| Property | Value |
| --- | --- |
| Molecular Weight (g/mol) | 132.2 |
| Boiling Point @ 760 mmHg, 1.01 ar | 146° C. (295° F.) |
| Flash Point (Setaflash Closed Cup | 45.5° C. (113.9° F.) |
| Freezing Point | −66° C. (−87° F.) |
| Vapor pressure@ 20° C. - extrapolated | 2.8 mmHg |
|  | 355 Pa |
| Specific gravity (20/20° C.) | 0.964 |
| Liquid Density @ 20° C. | 0.967 g/cm3 |
| @ 25° C. | 0.963 g/cm3 |
| Vapor Density (air = 1) | 4.6 |
| Viscosity (cP or mPa · s @ 25° C.) | 1.1 |
| Surface tension (dynes/cm or mN/m @ 20° C.) | 26.9 |
| Specific heat (J/g/° C. @ 25° C.) | 1.85 |
| Heat of vaporization (J/g) at normal boiling point | 296 |

Dowanol™ TPM Glycol Ether (Tripropylene glycol monomethyl ether, or TPM) (Dow Chemical Company Ltd). Characteristic physical properties of the Dowanol™ TPM are:

| | | |
|---|---|---|
| Molecular weight (g/mol) | | 206.3 |
| Boiling point @ 760 mmHg, 1.01 bar | 469° F. | 243° C. |
| Flash point (Closed Cup) | 250° F. | 121° C. |
| Freezing point | −108° F. | −78° C. |
| Vapor pressure ® 20° C. - extrapolated | | 0.01 mmHg 0.02 mbar |
| Specific gravity (25/25° C.) | | 0.965 |
| Density @ 20° C. | 8.06 lb/gal | 0.966 g/cm$^3$ |
| @ 25° C. | 8.03 lb/gal | 0.962 g/cm$^3$ |
| Viscosity (cP or mPa · s @ 25° C.) | | 5.5 |
| Surface tension (dynes/cm or mN/m @ 25° C.) | | 30.0 |
| Specific heat (J/g/° C. @ 25° C.) | | 2.12 |
| Heat of vaporization (J/g) at normal boiling point | | 210 |
| Net heat of combustion (kJ/g) - predicted @ 25° C. | | 27.8 |
| Autoignition temperature | 531° F. | 277° C. |
| Evaporation rate | (n-butyl acetate = 1.0) | 0.0026 |
| | (diethyl ether = 1.0) | >1200 |
| Solubility, g/100 g @ 25° C. | | |
| Solvent in water | | — |
| Water in solvent | | — |
| Hansen solubility parameters (J/cm$^3$)$^{1/2}$ | | |
| _d (Dispersion) | | 15.1 |
| _p (Polar) | | 3.5 |
| _h (Hydrogen bonding) | | 11.5 |
| Flammable limits (vol. % in air) | | |
| Lower | | 0.7 |
| Upper | | 14.8 |

Cymel® 370 (Supplier: Allnex): a fast-curing crosslinking agent including a partially methylated melamine monomer (50% by weight) in iso-butanol. The material does not require a strong acid catalyst.

Duroftal® 6117 VPE (Supplier: Allnex): a solvent-borne hydroxylated polyester flexibilizer for amino resin cross-linking, and having a Tg of about −55° C.

S-24-25 Coating (EXXENE®, Corpus Christi, Tex.): a primerless abrasion resistance silicone hard coating for application upon polycarbonate and ophthalmic substrates, the coating is a clear liquid sol-gel solution, curable via thermal curing. Characteristic physical properties are:

| | |
|---|---|
| Main Component | Organic modified Silicone |
| Appearance | Clear Liquid |
| Viscosity@25° C.(cP) | 25-28 |
| Density@25° C. | 0.93 |
| Solids Level (%) | 24~26 |
| pH | 4~5 |

CN2300 (Sartomer): a high functionality, fast-curing, high molecular weight polyester acrylate oligomer having a (low) viscosity of 600 cps at 25° C., an acrylate equivalent weight of 175, a Tg (by DMA) of 96° C., and a surface tension of 32 dynes/cm.

SR1135: (Sartomer): a photoinitiator—blend of phosphine oxide, trimethylbenzophenone, methylbenzophenone, oligo phenyl propanones.

Irgacure® 2022 (BASF): a liquid photoinitiator blend used to initiate radical polymerization of unsaturated resins after UV light exposure; may be used in pigmented formulations of all colors for curing of thick sections or for UV-stabilized clear coatings.

6103 (Eternal Chem. Co.): aliphatic urethane hexaacrylate, a hexafunctional, clean and clear oligomer.

Nanobyk® 3605: nanoparticle dispersion surface-treated silica nanoparticles.

Silixan A120 (Silixan Gmbh, Saarbruecken-Guedingen, Germany): UV protection additive solution, 20% solids—hindered amine light stabilizer (HALS) in 1-methoxy-2-propanol.

Print head—Fujifilm Dimatix™ Materials Printer 10 PL model #DMCLCP—11610/PN 700-11670-01 (Fujifilm Dimatix Inc.).

Printer—OmniJet 100 (Unij et Co. Ltd, Kyungki-do 462-807 Korea).

Exposure of samples to ultraviolet (UV) light was performed using a UV lamp.

Olympus® BX51 Fluorescence Microscope, for capture of optical images.

Spectrophotometric measurements were performed using a Cary 5000 Spectrophotometer, Version 1.12 (Varian Inc.).

Example 1

64.48 grams of X-10 resin solution were mixed with 33.98 grams of PMA solvent in a 200 ml glass beaker equipped with a magnetic stirrer. After mixing the components for 10 minutes, 1.54 grams of dye PH-1209 (Chromtech, Ltd.) were added to the diluted resin, while mixing was continued for another 20 minutes.

Example 2

64.48 grams of the resin solution were mixed with 33.78 grams of PMA solvent in a 200 ml glass beaker equipped with a magnetic stirrer. After mixing the components for 10 minutes, 1.54 grams of dye PH-1209 (Chromtech, Ltd.) and 0.2 grams of the surfactant BYK®-333 were added to the diluted resin, while mixing was continued for another 20 minutes.

Example 3

64.48 grams of the resin solution were mixed with 28.71 grams of PMA and 5.07 grams of TPM solvents in a 200 ml glass beaker equipped with a magnetic stirrer. After mixing the components for 10 minutes, 1.54 grams of dye PH-1209 (Chromtech, Ltd.) and 0.2 grams of the surfactant BYK®-333 were added to the diluted resin, while mixing was continued for another 20 minutes.

Example 4

64.48 grams of the resin solution were mixed with 28.71 grams of PMA and 5.07 grams of TPM solvents in a 200 ml glass beaker equipped with a magnetic stirrer. After mixing the components for 10 minutes, 1.54 grams of dye PH-1209 (Chromtech, Ltd.) and 0.2 grams of surfactant (0.05 grams BYK®-333 and 0.15 grams BYK®-358N) were added to the diluted resin, while mixing was continued for another 20 minutes.

Example 5

64.48 grams of the resin solution were mixed with 33.78 grams of PMA solvent in a 200 ml glass beaker equipped with a magnetic stirrer. After mixing the components for 10 minutes, 1.54 grams of dye PH-1209 (Chromtech, Ltd.) and 0.2 grams of surfactant (0.05 grams BYK®-333 and 0.15 grams BYK®-358N) were added to the diluted resin, while mixing was continued for another 20 minutes.

Example 6

64.48 grams of the resin solution were mixed with 33.98 grams of PMA solvent in a 200 ml glass beaker equipped with a magnetic stirrer. After mixing the components for 10 minutes, 1.54 grams of dye PH-2228 (Chromtech, Ltd.) were added to the diluted resin, while mixing was continued for another 20 minutes.

Example 7

64.48 grams of the resin solution were mixed with 33.78 grams of PMA solvent in a 200 ml glass beaker equipped with a magnetic stirrer. After mixing the components for 10 minutes, 1.54 grams of dye PH-2228 (Chromtech, Ltd.) and 0.2 grams of the surfactant BYK®-333 were added to the diluted resin, while mixing was continued for another 20 minutes.

Example 8

64.48 grams of the resin solution were mixed with 28.71 grams of PMA and 5.07 grams of TPM solvents in a 200 ml glass beaker equipped with a magnetic stirrer. After mixing the components for 10 minutes, 1.54 grams of dye PH-2228 (Chromtech, Ltd.) and 0.2 grams of the surfactant BYK®-333 were added to the diluted resin, while mixing was continued for another 20 minutes.

Example 9

64.48 grams of the resin solution were mixed with 28.71 grams of PMA and 5.07 grams of TPM solvents in a 200 ml glass beaker equipped with a magnetic stirrer. After mixing the components for 10 minutes, 1.54 grams of dye PH-2228 (Chromtech, Ltd.) and 0.2 grams of surfactant (0.05 grams BYK®-333 and 0.15 grams BYK®-358N) were added to the diluted resin, while mixing was continued for another 20 minutes.

Example 10

64.48 grams of the resin solution were mixed with 33.78 grams of PMA solvent in a 200 ml glass beaker equipped with a magnetic stirrer. After mixing the components for 10 minutes, 1.54 grams of dye PH-2228 (Chromtech, Ltd.) and 0.2 grams of surfactant (0.05 grams BYK®-333 and 0.15 grams BYK®-358N) were added to the diluted resin, while mixing was continued for another 20 minutes.

Example 11

64.48 grams of the resin solution were mixed with 33.98 grams of PMA solvent in a 200 ml glass beaker equipped with a magnetic stirrer. After mixing the components for 10 minutes, 1.54 grams of dye no. 465 (Chromtech, Ltd.) were added to the diluted resin, while mixing was continued for another 20 minutes.

Example 12

64.48 grams of the resin solution were mixed with 33.78 grams of PMA solvent in a 200 ml glass beaker equipped with a magnetic stirrer. After mixing the components for 10 minutes, 1.54 grams of dye no. 465 (Chromtech, Ltd.) and 0.2 grams of the surfactant BYK®-333 were added to the diluted resin, while mixing was continued for another 20 minutes.

Example 13

64.48 grams of the resin solution were mixed with 28.71 grams of PMA and 5.07 grams of TPM solvents in a 200 ml glass beaker equipped with a magnetic stirrer. After mixing the components for 10 minutes, 1.54 grams of dye no. 465 (Chromtech, Ltd.) and 0.2 grams of the surfactant BYK®-333 were added to the diluted resin, while mixing was continued for another 20 minutes.

Example 14

64.48 grams of the resin solution were mixed with 28.71 grams of PMA and 5.07 grams of TPM solvents in a 200 ml glass beaker equipped with a magnetic stirrer. After mixing the components for 10 minutes, 1.54 grams of dye no. 465 (Chromtech, Ltd.) and 0.2 grams of surfactant (0.05 grams BYK®-333 and 0.15 grams BYK®-358N) were added to the diluted resin, while mixing was continued for another 20 minutes.

Example 15

64.48 grams of the resin solution were mixed with 33.78 grams of PMA solvent in a 200 ml glass beaker equipped with a magnetic stirrer. After mixing the components for 10 minutes, 1.54 grams of dye no. 465 (Chromtech, Ltd.) and 0.2 grams of surfactant (0.05 grams BYK®-333 and 0.15 grams BYK®-358N) were added to the diluted resin, while mixing was continued for another 20 minutes.

Example 16

64.48 grams of the resin solution were mixed with 33.98 grams of PMA solvent in a 200 ml glass beaker equipped with a magnetic stirrer. After mixing the components for 10 minutes, 1.54 grams of dye no. 4114 (Chromtech, Ltd.) were added to the diluted resin, while mixing was continued for another 20 minutes.

Example 17

64.48 grams of the resin solution were mixed with 33.78 grams of PMA solvent in a 200 ml glass beaker equipped with a magnetic stirrer. After mixing the components for 10 minutes, 1.54 grams of dye no. 4114 (Chromtech, Ltd.) and 0.2 grams of the surfactant BYK®-333 were added to the diluted resin, while mixing was continued for another 20 minutes.

Example 18

64.48 grams of the resin solution were mixed with 28.71 grams of PMA and 5.07 grams of TPM solvents in a 200 ml glass beaker equipped with a magnetic stirrer. After mixing the components for 10 minutes, 1.54 grams of dye no. 4114 (Chromtech, Ltd.) and 0.2 grams of the surfactant BYK®-333 were added to the diluted resin, while mixing was continued for another 20 minutes.

Example 19

64.48 grams of the resin solution were mixed with 28.71 grams of PMA and 5.07 grams of TPM solvents in a 200 ml glass beaker equipped with a magnetic stirrer. After mixing the components for 10 minutes, 1.54 grams of dye no. 4114 (Chromtech, Ltd.) and 0.2 grams of surfactant (0.05 grams BYK®-333 and 0.15 grams BYK®-358N) were added to the diluted resin, while mixing was continued for another 20 minutes.

Example 20

64.48 grams of the resin solution were mixed with 33.78 grams of PMA solvent in a 200 ml glass beaker equipped with a magnetic stirrer. After mixing the components for 10 minutes, 1.54 grams of dye no. 4114 (Chromtech, Ltd.) and 0.2 grams of surfactant (0.05 grams BYK®-333 and 0.15 grams BYK®-358N) were added to the diluted resin, while mixing was continued for another 20 minutes.

Example 21

Printing Test

The printing test was performed using an Inkjet printer (Fujifilm Dimatix™ Materials Printer DMP-2831). A sample having dual functionality was prepared by printing two different inks, each ink containing a different photochromic dye. The sample was prepared in a two-step process in which an array of drops containing the first function (dye 1) was printed at a distance of 100 micrometer from each other, measured from the center of a first drop to the center of the adjacently jetted drop. In order to control the viscosity at jetting and the spreading of the drops, the printhead was heated to 40° C. and the substrate was heated to 40° C.

The second function was added to the layer by jetting drops of the second ink containing the second function between the drops of the first array of drops. The drops of the second function were printed at the same general conditions described above, but were jetted so as to be placed at a distance of 50 micrometers between the drops of the first function to the drops of the second function, measured from the center of the first function drop to the center of the second function drop.

Example 22

Printing Procedure

Printing was performed on an OmniJet 100 (Unijet), using a Dimatix™ print head (Fujifilm Dimatix™ 10 PL model #DMCLCP—11610/PN 700-11670-01). The ink was filtered using syringe filters (1 micrometer). The print head was pre-heated to 40° C. The drop characteristics were then optimized using a stroboscope mounted on the printer (camera and light source synchronized with the jetting frequency). The waveform was optimized for the ink, jetted at a frequency of 1500 Hz. After jetting, a drop size of about 50 micrometer (on the substrate) was achieved.

The first photochromic ink was printed on a glass slide, such that the distance between drops was about 140 micrometers. This distance enabled the deposition of the second ink drops in-between the drops of the first ink.

A second print head was used for jetting the second ink, using essentially the identical printing parameters. The printing was performed using a 70 micrometer offset, such that each of the second set of ink drops was disposed in-between the first ink drops. Thermal curing was then performed at 120° C. for 60 minutes.

Example 23

The procedure of Example 22 was performed using a first, blue ink, prepared according to Example 14 and a second, yellow ink, prepared according to Example 7.

Example 24

The procedure of Example 22 was performed using a first, blue ink prepared according to Example 14 and a second, red ink, prepared according to Example 3.

Example 25

Figure 5:
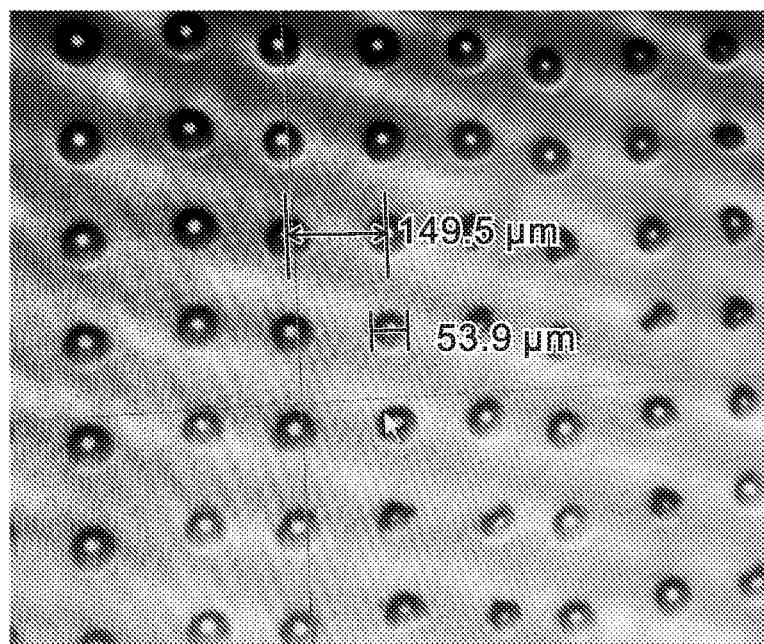
FIG. 5 is a magnified, optical image of an optical construction including an array of blue ink dots attached to an optical substrate.
Figure 6:
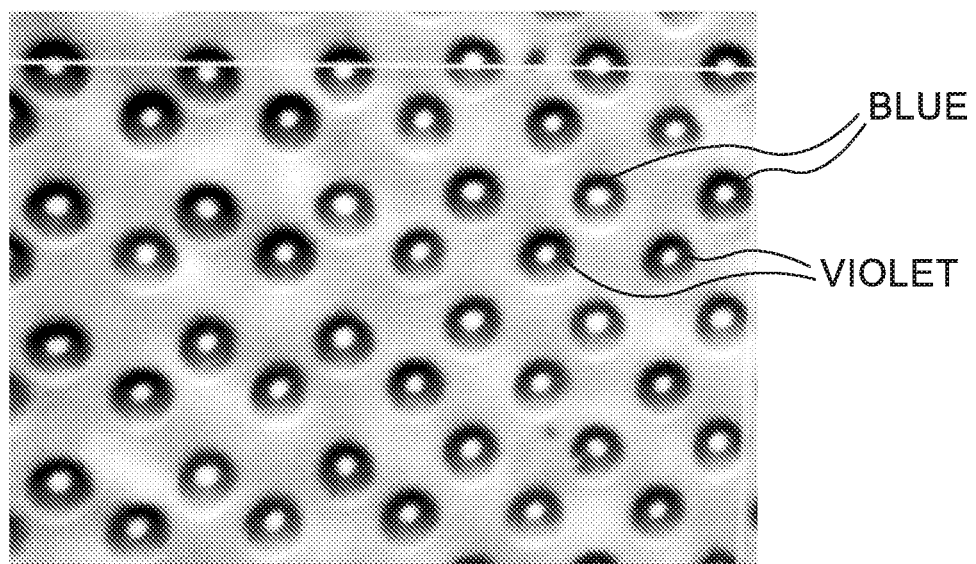
FIG. 6 provides a magnified, optical image of the array of blue ink dots on an optical substrate, as in FIG. 5, to which substrate has been fixedly added, in interdisposed fashion, an array of violet ink dots, in accordance with the present invention.

The procedure of Example 22 was performed using a first, blue ink, prepared according to Example 14, and a second, violet ink, prepared according to Example 20. A magnified, optical image of the first set of blue ink drops is provided in FIG. 5. FIG. 6 provides a magnified, optical image of the array of blue ink dots on an optical substrate, as in FIG. 5, to which substrate has been fixedly added, in interdisposed or interlaced fashion, an array of violet ink dots, in accordance with the present invention.

Example 26

The blue ink of Example 25 was inkjetted on a first glass slide to produce a blue ink area; the violet ink of Example 25 was inkjetted on a second glass slide to produce a violet ink area; these blue and violet inks were then inkjetted onto the first glass slide according to the procedure of Example 22, to form an area containing interlaced (interdisposed) blue and violet photochromic ink dots.

The slides were illuminated with UV light for 2 minutes using a UV lamp prior to the images being captured.

Figure 7:
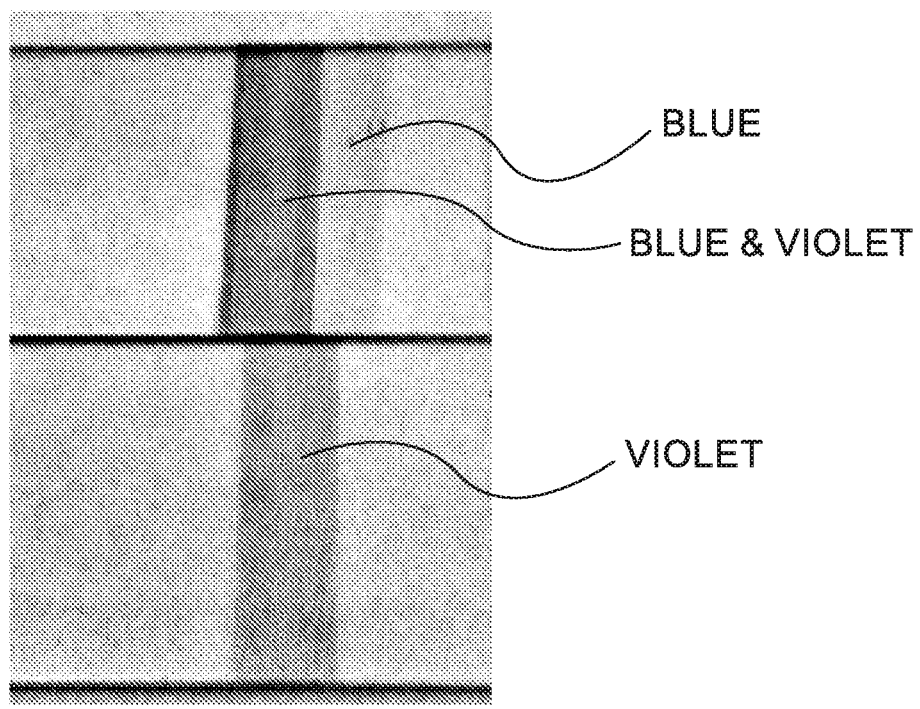
FIG. 7 provides magnified, optical images of optical constructions having: (i) a field solely having blue ink dots; (ii) a field solely having violet ink dots, and (iii) a field having both blue dots and violet dots.

Magnified, optical images showing the three fields of dots are provided in FIG. 7. Referring now to the top slide, the field of blue and violet dots is situated to the left of the field of blue dots. It will be appreciated that the field of blue dots appears relatively faint. In the bottom slide, the field of violet dots may be seen.

It is visible to the naked eye that the area with field of blue and violet dots has a different shade than the fields containing solely violet dots or solely blue dots.

Example 27

Spectrophotometric Measurements

Figure 8:
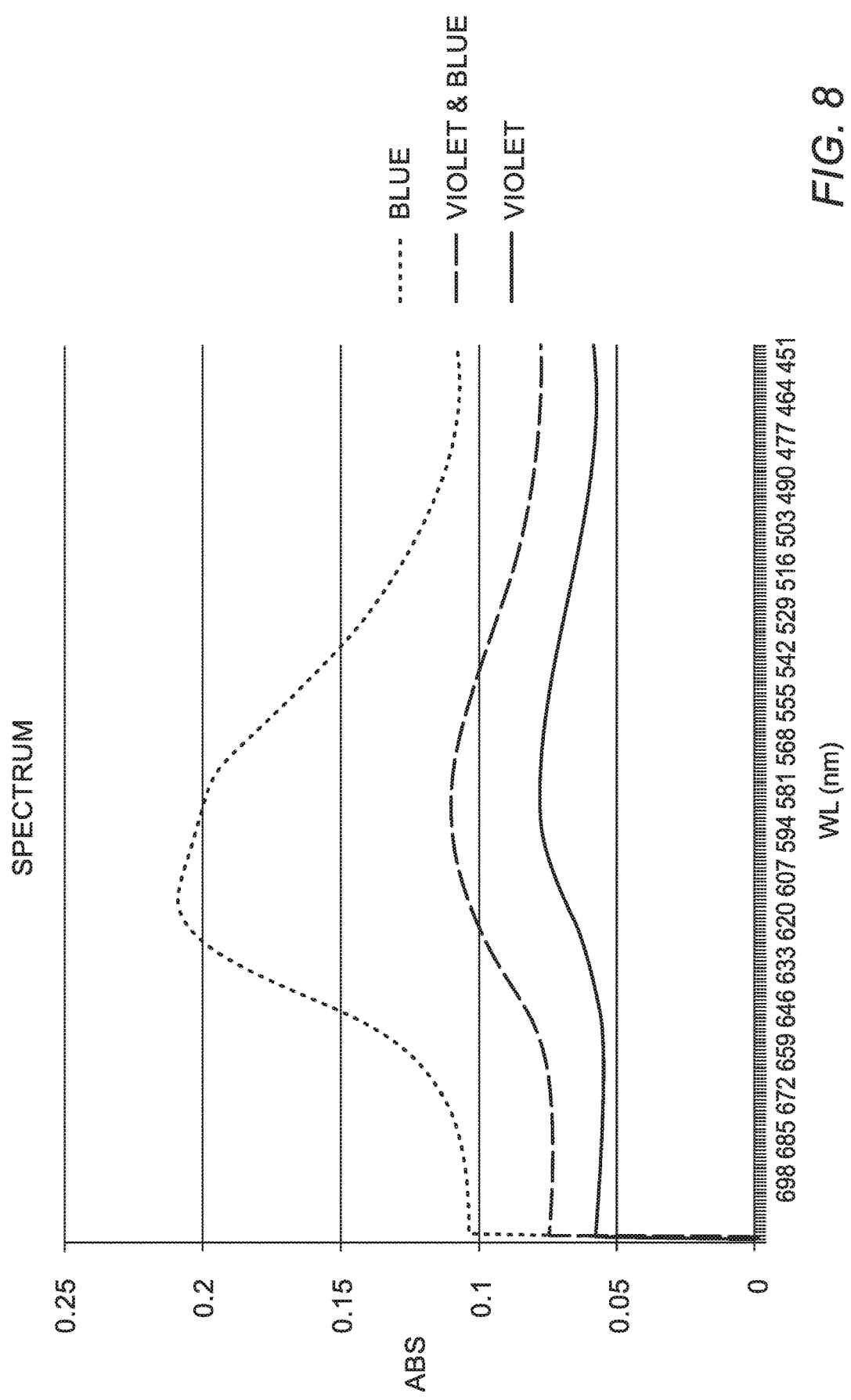
FIG. 8 plots absorption as a function of wavelength for the fields provided in FIG. 7.

The printed samples of Example 25 were exposed to ultraviolet (UV) light for 2 minutes using a UV lamp, and were then placed in the spectrophotometer (Cary 5000, Version 1.12 (Varian Inc.)) for measurement. FIG. 8 plots absorption as a function of wavelength ("WL", in nm) for a field or area solely having the blue ink, for an area solely having the violet ink, and for an area having both blue and violet dots (as described in Example 26).

For each of these fields, maximum absorption occurred at the following wavelengths:
 blue field: 611 nm;
 violet field: 579 nm
 blue and violet field: 585 nm.

Figure 9:
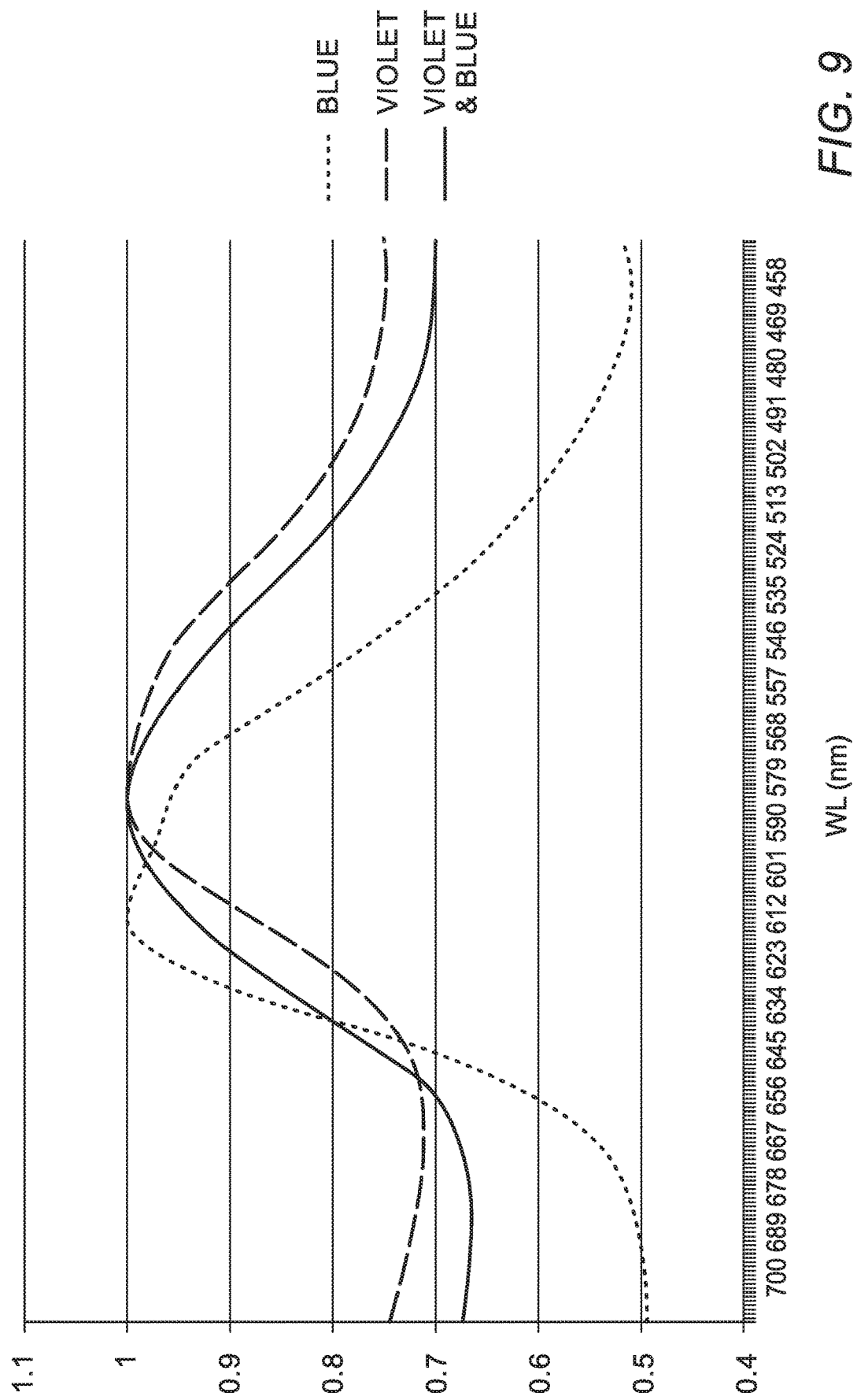
FIG. 9 provides relative absorption plots for the fields provided in FIG. 7.

Each of the three absorption plots may be normalized by dividing all the absorption values of a particular field by the maximum absorption value of that field, such that the maximum absorption value for each field is 1. The relative absorption plots obtained are provided in FIG. 9.

Example 28

An anti-scratch inkjet formulation that may be particularly suitable for use in conjunction with the invention has the following composition:
6121F-80: 20%
CN2300: 10%
SR1135: 5%
Irgacure® 2022: 2%
6103: 5%
Nanobyk® 3605: 5%
Dowanol™ PMA: 60%

The anti-scratch formulation is UV-curable, and has a characteristic surface tension and a characteristic viscosity suitable for inkjet inks. The dried dots or layer produced from this formulation exhibit improved abrasion resistance and impact resistance, relative to dried dots and layer of the same composition, but devoid of the silica nanoparticles (Nanobyk® 3605). Moreover, the combination of resins utilized in the formulation themselves contribute to the anti-scratch, abrasion resistance and impact resistance properties.

Example 29

A UV-absorbing inkjet formulation that may be particularly suitable for producing a coated optical substrate in conjunction with the invention has the following composition:
6121F-80: 20%
CN2300: 10%
SR1135: 5%
Silixan A120: 5%
Irgacure® 2022 2%
6103: 5%
Nanobyk® 3605 5%
Dowanol™ PMA: 55%

The formulation is UV-curable, and has a characteristic surface tension and a characteristic viscosity suitable for inkjet inks.

Example 30

The glass transition temperature (Tg) of cured resins was determined using differential scanning calorimetry (DSC). A temperature curable coating material (X-10), a solvent (Dowanol™ PMA) and optionally, a crosslinking formulation (Cymel 370) and/or a flexibilizing formulation (Duroftal® 6117 VPE) were weighed out on an analytical balance, to obtain a total weight of 10 grams. After shaking for 2 minutes to obtain a clear, homogeneous solution, 1 ml of the solution was deposited on a glass microscope slide and left to dry at 35° C. over a hot plate for 10 hours. Each sample was cured by heating in an oven at 120° C. for 2 hours to produce a cured coating. The cured layer was detached from the microscope slide using a scalpel, and 0.5 grams of polymer were introduced into the DSC chamber.

Example 31

Differential scanning calorimetry runs were performed using a DSC823e (Mettler Toledo AG), in a six-phase procedure. Air is delivered to the chamber at a constant rate. After the sample has been introduced to the DSC chamber, the temperature is maintained for 5 minutes at −10° C. (Phase I). The temperature is then ramped up from −10° C. to 120° C. at a rate of 20° C./min. (Phase II). The temperature is held at 120° C. for 3 minutes (Phase III), after which the temperature is ramped down from 120° C. to −10° C. at a rate of 20° C./min. (Phase IV). The temperature is held constant for 10 minutes. (Phase V). Finally, the temperature is ramped back up from −10° C. to 120° C. at a rate of 20° C./min. (Phase VI).

Examples 32-35

DSC runs were performed on the following compositions (all figures in weight-%), which were prepared according to Example 30. The DSC runs were performed according to the procedure provided in Example 31.

| Component | Example 32 | Example 33 | Example 34 | Example 35 |
|---|---|---|---|---|
| X-10 | 65 | 61.5 | 61.5 | 61.5 |
| Cymel ® 370 | — | 3.5 | — | 1.75 |
| Duroftal ® 6117 VPE | — | — | 3.5 | 1.75 |
| Dowanol ™ PMA | 35 | 35 | 35 | 35 |

From the DSC curves, the Tg of each of the cured resins was determined, as follows:

| | Tg (° C.) |
|---|---|
| Example 32 | 56.22 |
| Example 33 | 57.11 |
| Example 34 | 55.41 |
| Example 35 | 56.31 |

All of the formulations in Examples 32-35 were found to be suitable for use in the coated optical substrates of the present invention. Moreover, the results demonstrate how to modify the formulation so as to change the Tg, and how to modify the properties of the formulation while maintaining, or controlling, the Tg. By way of example, with reference to Example 32, Example 33 exhibits a small increase in Tg, due to the addition of the (Cymel® 370) crosslinking agent. The opposite effect is achieved by adding a small quantity of the (Duroftal® 6117 VPE) flexibilizing agent: with respect to Example 32, the Tg is reduced. The Tg may be controlled or maintained by adding suitable quantities of both the crosslinking and flexibilizing agents, as demonstrated by Example 35. It will be appreciated by those of ordinary skill in the art that further modifications in the Tg and/or in the physical characteristics of the cured material may be engineered using this materials design approach.

Example 36

3.00 grams of X-10 resin solution were mixed with 35.5 grams of PMA solvent, 15.40 grams of TPM, 46 gr of Dowanol® PPh (Propylene glycol phenyl ether, CAS #770-35-4) in a 200 ml glass beaker equipped with a magnetic stirrer. After mixing the components for 10 minutes, 0.10 grams of dye PH-1209 (Chromtech, Ltd.) were added to the diluted resin, while mixing was continued for another 20 minutes to produce the ink.

Example 37

78.43 grams of the resin solution were mixed with 19.43 grams of PMA solvent in a 200 ml glass beaker equipped with a magnetic stirrer. After mixing the components for 10 minutes, 2.00 grams of dye PH-1209 (Chromtech, Ltd.) and 0.14 grams of the surfactant BYK®-333 were added to the diluted resin, while mixing was continued for another 20 minutes.

Example 38

The inks from Examples 36 and 37 were inkjetted (~6 picoliter drops) on a glass slide and cured, as described hereinabove, to produce several hundred photochromic ink dots. The solids content of the inks was about 50% and 1%, respectively. The ink dots of Example 36 had a characteristic diameter of approximately 50 micrometers, and a characteristic height of approximately 6.5 micrometers. The ink dots of Example 37 had a characteristic diameter of approximately 50 micrometers, and a characteristic height of approximately 0.9 micrometers. Both results correlate well with the calculated heights, based upon the solids concentrations of the inks.

Examples 39-40

70 grams of the resin solution were mixed with 28 grams of PMA solvent in a 200 ml glass beaker equipped with a magnetic stirrer. After mixing the components for 10 minutes, 2 grams of dye C250-483 Opti-Safe Lens Dye Packet, RASPBERRY (Phantom Research Laboratories, Inc.) were added to the diluted resin (Example 39) and BLACK (Example 40). Mixing was continued for another 20 minutes to produce the respective fixed tint colorant inks.

Field of View

Using a more robust, statistical approach, however, may better distinguish between the inventive coated optical substrates and the coated optical substrates known in the art. Thus, in some embodiments of the present invention, the coated optical substrate may be characterized as at least first and second pluralities of ink dots interdisposed or interlaced on the optical substrate, within a representative "field of view", the first and second pluralities of dots being made of different compositions and exhibiting differing functionalities. Assuming the characterization of the dot is obtained through image processing, a "field of view" contains a plurality of dot images, of which at least 10 dot images are suitable for image processing. Both the field of view and the dot images selected for analysis are preferably representative of the total population of ink dots on the substrate (e.g., in terms of dot shape).

In the field of view procedure, a printed sample, preferably containing a high incidence of single ink dots, is scanned manually on the LEXT microscope, using a ×20 magnification to obtain a field that includes at least 10 single dots in a single frame. Care should be taken to select a field whose ink dot quality is fairly representative of the overall ink dot quality of the printed sample.

Each dot within the selected frame is analyzed separately. Dots that are "cleaved" by the frame margins (which may be considered a square or rectangular geometric projection) are considered to be outside of the frame, and are not analyzed. Any satellites are excluded from the analysis. A "satellite" is defined as an ink dot whose area is less than 25% of the average dot area of the dots within the frame, for frames having a generally homogeneous dot size, or as an ink dot whose area is less than 25% of the nearest adjacent dot, for non-homogeneous frames.

Each distinct ink dot is subsequently magnified with a ×100 zoom, and image processing may be effected according to the procedure provided herein/procedures known to those of skill in the art.

As used herein in the specification and in the claims section that follows, the term "percent", or "%", refers to percent by weight, unless specifically indicated otherwise.

As used herein in the specification and in the claims section that follows, the terms "anti-glare", "anti-reflectance"; "anti-fog"; "ultraviolet absorber"; "photochromic", and the like, unless otherwise specified, are meant as used in the art of optical substrate coatings.

As used herein in the specification and in the claims section that follows, the term "anti-scratch", with respect to a material such as a formulation or a coating, refers to a material whose dried and cured coating exhibits a haze value of less than 6%, using the following taber abrasion properties, according to ASTM D1004-08 (CS 10 F wheel, 500 g Load, 500 cycles).

Similarly, the term "ratio", as used herein in the specification and in the claims section that follows, refers to a weight ratio, unless specifically indicated otherwise.

As used herein in the specification and in the claims section that follows, the term "multi-functional area", refers to an area contained by a rectangular projection normally projecting from a direction of the layer, onto the broad surface, the rectangular projection having a contiguous area of up to 0.04 square millimeters and a short side of at least 20 micrometers.

As used herein in the specification and in the claims section that follows, the term "characteristic", with respect to a dot dimension such as height, length or diameter, refers to the maximal value of that dot dimension. By way of example, for a square dot, 30 micrometers on a side, the characteristic diameter would be the diagonal, i.e., $30\sqrt{2}=42.4$ micrometers. For a dot having some peaks and crannies on the top surface, distal to the optical substrate, the dot height would be the maximum height measured normal to the top surface of the substrate. For a plurality of dots, the characteristic dimension is the average of the characteristic dimension of the individual dots within the plurality.

As used herein in the specification and in the claims section that follows, the term "average", with respect to a dimension such as the height, length or diameter of a plurality of dots, refers to the arithmetic mean of that dimension, and is calculated using the characteristic dimension for each dot in the plurality.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

What is claimed is:

1. An optical device comprising:
   (a) an ophthalmic substrate; and
   (b) at least one multi-functional layer, fixedly attached to an ophthalmic surface of said ophthalmic substrate; the multi-functional layer including a plurality of multi-functional areas, each multi-functional area of the multi-functional areas including a set of functional dots containing photochromic colorant, each of said functional dots fractionally covering said multi-functional area; wherein each said multi-functional area is a rectangular area having a contiguous area of up to 0.04 square millimeters and a short side of at least 20 micrometers;
      said set of functional dots including: a first group of the functional dots in which said photochromic colorant is a first photochromic colorant; and a second group of the functional dots in which said photochromic colorant is a second photochromic colorant;
   wherein said first and second photochromic colorants are different photochromic colorants;
   and wherein each of said functional dots is individually and directly bonded to said ophthalmic surface of said ophthalmic substrate.

2. The optical device of claim 1, wherein, within a particular multi-functional area, said photochromic colorant of said set of functional dots covers less than 70% of a total surface area of said particular multi-functional area.

3. The optical device of claim 2, wherein, within each said area of said multi-functional areas, a gap between adjacent functional dots belonging to said first and second groups, respectively, is at least 5 μm, and at most 50 μm.

4. The optical device of claim 1, wherein said ophthalmic substrate is selected from the group consisting of glass and polycarbonate.

5. The optical device of claim 1, wherein said ophthalmic substrate includes a lens.

6. The optical device of claim 1, wherein said functional dots of said first group and said functional dots of said second group are jetted drops.

7. The optical device of claim 1, wherein said functional dots of said first group and said functional dots of said second group are ink dots.

8. The optical device of claim 1, wherein said first group and said second group of said functional dots form interlaced arrays.

9. The optical device of claim 1, wherein said ophthalmic surface of said ophthalmic substrate is a surface of an anti-wetting layer.

10. The optical device of claim 1, wherein said ophthalmic substrate includes a thermoplastic polymer.

11. An optical device comprising:
    (a) an ophthalmic substrate having a broad face, and a layer of anti-wetting material at least partially covering said broad face to form an ophthalmic surface; and
    (b) at least one multi-functional layer, fixedly attached to said ophthalmic surface; the multi-functional layer including a plurality of multi-functional areas, each multi-functional area of the multi-functional areas including a set of functional dots containing photochromic colorant, each of said functional dots fractionally covering said multi-functional area; wherein each said multi-functional area is a rectangular area having a contiguous area of up to 0.04 square millimeters and a short side of at least 20 micrometers;
       said set of functional dots including: a first group of the functional dots in which said photochromic colorant is a first photochromic colorant; and a second group of said functional dots in which said photochromic colorant is a second colorant;
    wherein said layer of anti-wetting material is disposed in an optical path between said broad face of said ophthalmic substrate and the plurality of multi-functional areas of said at least one multi-functional layer;
    wherein said first and second photochromic colorants are different photochromic colorants;
    and wherein each of said functional dots is individually bonded to said ophthalmic surface of said ophthalmic substrate.

12. The optical device of claim 11, wherein said multi-functional layer is separated from said ophthalmic substrate by a distance of at most 1000 nm.

13. The optical device of claim 11, wherein said layer of said anti-wetting material is continuous with respect to said ophthalmic substrate.

14. The optical device of claim 13, wherein said multi-functional layer is separated from said ophthalmic substrate by a distance of at most 1000 nm.

15. An optical device comprising:
    (a) an ophthalmic substrate; and
    (b) at least one multi-functional layer, fixedly attached to an ophthalmic surface of said ophthalmic substrate; said at least one multi-functional layer including a plurality of multi-functional areas, each multi-functional area thereof including a set of functional dots containing photochromic colorant, each of the functional dots fractionally covering said multi-functional area; wherein each said multi-functional area is a rectangular area having a contiguous area of up to 0.04 square millimeters and a short side of at least 20 micrometers;
       the set of functional dots including: a first group of the functional dots in which said photochromic colorant is a first photochromic colorant; and a second group of the functional dots in which said photochromic colorant is a second colorant;
    wherein said ophthalmic substrate is a curved ophthalmic substrate, and wherein said ophthalmic surface is a curved ophthalmic surface,
    wherein said first and second photochromic colorants are different ophthalmic colorants;
    wherein each of said functional dots is individually and directly bonded to said curved ophthalmic surface.

16. The optical device of claim 15, said multi-functional layer being separated from said ophthalmic substrate by a distance of at most 1000 nm.

17. The optical device of claim 15, wherein, within each said area of said multi-functional areas, a gap between adjacent functional dots belonging to said first and second groups, respectively, is at least 5 μm, and at most 50 μm.

18. The optical device of claim 15, said functional dots within said multi-functional area being distributed over a nominal surface area, said functional dots having a total coverage area, a ratio of said total coverage area to said nominal surface area being at most 0.65.

19. The optical device of claim 15, wherein said first and second groups of functional dots have a composition differing with respect to a composition of said surface of said ophthalmic substrate.

20. The optical device of claim 15, wherein said first and second groups of functional dots include jetted dots.

* * * * *